(12) United States Patent
Huckett et al.

(10) Patent No.: US 7,289,516 B2
(45) Date of Patent: Oct. 30, 2007

(54) UNIVERSAL INTERFACE

(75) Inventors: Simon James Huckett, West Hanningfield (GB); Kevin Loughran, Denville Township, NJ (US); Thomas A Parsons, Aberdeen, NJ (US); Joseph V Itri, Totawa, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 901 days.

(21) Appl. No.: 10/632,049

(22) Filed: Jul. 31, 2003

(65) Prior Publication Data

US 2005/0025177 A1    Feb. 3, 2005

(51) Int. Cl.
*H04J 3/16*    (2006.01)
*H04L 12/56*    (2006.01)

(52) U.S. Cl. ..................... 370/395.5; 370/466
(58) Field of Classification Search ............... 370/466, 370/401, 395.5, 395.6, 395.63, 395.61, 395.65, 370/395.64, 395.52, 467, 402, 469, 476, 370/352–356, 359, 362, 366
See application file for complete search history.

(56) References Cited

U.S. PATENT DOCUMENTS

| | | | |
|---|---|---|---|
| 5,519,700 A | 5/1996 | Punj | 370/60.1 |
| 5,661,785 A | 8/1997 | Carpenter et al. | 379/93.15 |
| 5,761,427 A | 6/1998 | Shah et al. | 395/200.53 |
| 5,889,850 A | 3/1999 | Sochacki | 379/329 |
| 5,936,943 A | 8/1999 | Sakagami et al. | 370/244 |
| 5,943,481 A | 8/1999 | Wakeland | 395/200.6 |
| 6,002,692 A | 12/1999 | Wills | 370/465 |
| 6,151,319 A | 11/2000 | Dommety et al. | 370/395 |
| 6,282,200 B1 | 8/2001 | Ikeda | 370/397 |
| 6,339,594 B1 | 1/2002 | Civanlar et al. | 370/352 |
| 6,751,224 B1 * | 6/2004 | Parruck et al. | 370/395.6 |
| 6,785,282 B1 * | 8/2004 | Gardner | 370/395.2 |
| 6,788,693 B1 * | 9/2004 | Christie et al. | 370/401 |

OTHER PUBLICATIONS

Byers 30-8-19, U.S. Appl. No. 09/519,813, Filed Mar. 6, 2000.
Chakrabartia 4-5, U.S. Appl. No. 09/520,557, Filed Mar. 8, 2000.

* cited by examiner

*Primary Examiner*—Chau Nguyen
*Assistant Examiner*—Farah Faroul
(74) *Attorney, Agent, or Firm*—Ozer M. N. Teitelbaum

(57) ABSTRACT

A universal interface apparatus having a processor for receiving one or more Network Interface signals having a transport mechanism associated therewith. The transport mechanism may include Asynchronous Transfer Mode, Internet Protocol, Frame Relay, Integrated Services Digital Network, High bit-rate Digital Subscriber Line, Asymmetric Digital Subscriber Line, Very High Data Rate Digital Subscriber Line, Symmetric Digital Subscriber Line, 10 base T, 100 Base T, Gigabit Ethernet and E1/T1. The processor may recognize the transport mechanism associated with each Network Interface signal. In the event Asynchronous Transfer Mode is recognized as the transport mechanism, the processor may also segment perform Asynchronous Transfer Mode (ATM) adaptation layer processing on each Network Interface signal. Further, the universal interface apparatus includes a bus interface device for generating a System Interface signal from the Asynchronous Transfer Mode (ATM) adaptation layer processed Network Interface signal in response to the recognized transport mechanism.

3 Claims, 3 Drawing Sheets

UNIVERSAL INTERFACE

FIELD OF THE INVENTION

This invention relates to the field of telecommunications, and more particularly to data transport mechanisms.

BACKGROUND OF THE INVENTION

The growth of data communication is reflection of modern life in the 21$^{st}$ century. Applications, such as e-mail and the Internet, have become a mainstream part of how people communicate. Data traffic has increased geometrically, perhaps, as acceptance and adoption of these communication forms continues to grow.

With the continued expansion of data applications, there is a growing consumer demand for accurate high-speed access. To support high-speed access, data communication systems presently employ any one of a number of distinct high-speed data communication formats or transport mechanisms. For the purposes of the present disclosure, a transport mechanism may include, for example, Asynchronous Transfer Mode ("ATM"), Internet Protocol ("IP"), Frame Relay ("FR"), Integrated Services Digital Network ("ISDN"), High bit-rate Digital Subscriber Line ("HDSL"), Asymmetric Digital Subscriber Line ("ADSL"), Very High Data Rate Digital Subscriber Line ("VDSL"), Symmetric Digital Subscriber Line ("SDSL") 10 base T, 100 Base T, Gigabit Ethernet and E1/T1.

As the demand for communication networks and devices supporting each of the aforementioned transport mechanisms continues to expand, the issue of compatibility has arisen. More particularly, each transport mechanism has a set of different protocols and different transmission systems. Thusly, as connectivity grows, the complexity and cost of interfacing network and devices supporting differing transport mechanisms has also increased.

For example, ATM is a transport mechanism that may be suited to support circuit switched and/or packet switched connections. This flexibility may be built into a layer of the ATM Protocol, commonly known as the ATM Adaptation Layer (AAL). Currently there are four defined adaptation layers, commonly referred to as AAL1, AAL2, AAL3/4 and AAL5. While these adaptation layers are classified as ATM, each requires distinct equipment to interface between segments of the communications network, or, in the alternative, between communications network and an end user through a subscriber line, for example. Thusly, equipment supporting an AAL1 adaptation layer may not support the operation of an AAL5 adaptation layer.

One technique to address this growing compatibility issue is to require a physically different interface for each transport mechanism. Thusly, a network may have a distinct interface for each adaptation layer—e.g., a design for AAL1, AAL2, AAL3/4 and AAL5. This approach, however, may raise the cost of operation. Replacing interface cards in the network may require training and, therefore require increased the costs of maintaining the network.

Therefore, a need exists for one interface capable of supporting any one of a number of transport mechanisms that may reduce the cost of operation of the network, require less training and lower the cost of maintaining the network.

SUMMARY OF THE INVENTION

The present invention provides a method for supporting multiple transport mechanisms within a single interface apparatus. More particularly, the present invention provides a compatible interface apparatus for signals having a variety of transport mechanisms. The present invention may therefore provide an interface apparatus for interfacing a Network Interface with a System Interface that supports an input signal having any one of a number of transport mechanisms.

In one embodiment, the interface apparatus includes a processor for receiving one or more Network Interface signal. Each Network Interface signal has a transport mechanism associated therewith, which the processor may recognize. In response to the recognizing the transport mechanism as ATM, the processor may perform adaptation layer functions, such as logical channel processing, error processing and segmentation and reassembling, for example, each Network Interface signal. The interface apparatus also includes a bus interface device for generating a System Interface signal. Each System Interface signal is generated from the segmented and reassembled Network Interface signal in which an adaptation layer function(s) has been performed, in response to the recognized transport mechanism.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Interfacing distinct equipment between segments of the communications network, or, in the alternative, between communications network and an end user through a subscriber line, may require different hardware designs to support each available transport mechanism. Consequently, the present invention provides a method for supporting multiple transport mechanisms within a single interface apparatus. More particularly, the present invention provides a compatible interface apparatus for signals having a variety of transport mechanisms. The present invention may therefore provide an interface apparatus for interfacing a Network Interface with a System Interface that supports an input signal having any one of a number of transport mechanisms.

Figure 1:
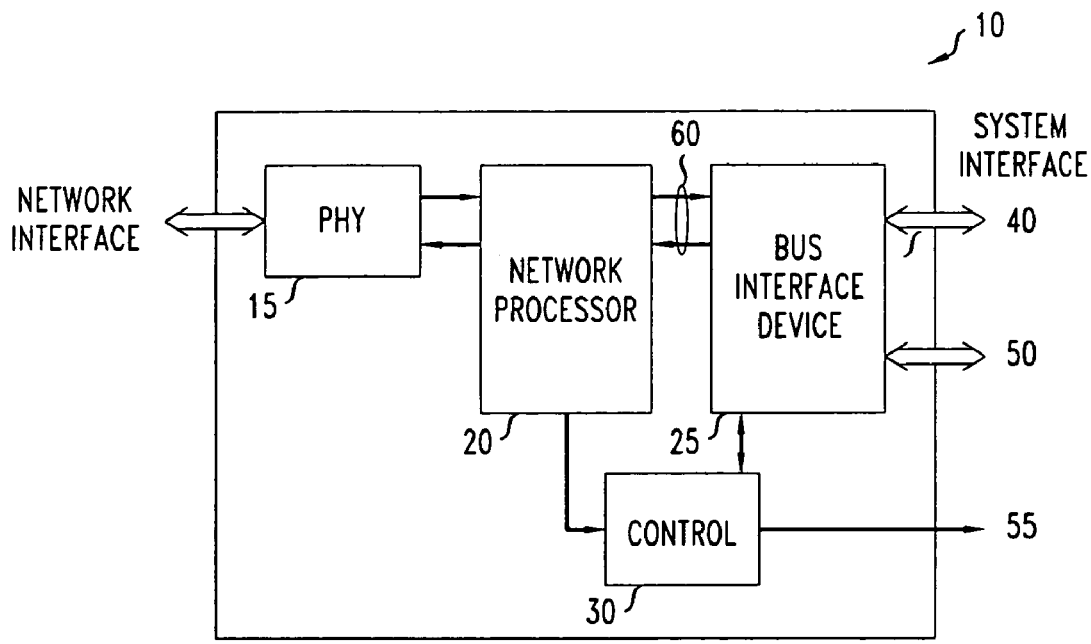
FIG. 1 depicts an embodiment of the present invention.

Referring to FIG. 1, a first embodiment of the present invention is illustrated. More particularly, an interface apparatus 10 is shown for interfacing distinct equipment between segments of the communications network or, in the alternative, between communications network and an end user through a subscriber line. In one example, interface apparatus 10 is a line card that interfaces a Network (e.g., external) Interface with a System (e.g., internal) Interface.

Interface apparatus 10 provides compatible interface apparatus for signals having a variety of transport mechanisms. Apparatus 10 receives one or more input signals from the Network Interface. These signals received comprise any one of a number of transport mechanisms. For example, the input signals from the Network Interface may include a format from any one of the defined adaptation layers of Asynchronous Transfer Mode (e.g., AAL1, AAL2, AAL3/4 and AAL5), Internet Protocol, Frame Relay, Integrated Services Digital Network, High bit-rate Digital Subscriber Line, Asymmetric Digital Subscriber Line, Very High Data Rate Digital Subscriber Line, Symmetric Digital Subscriber Line, 10 base T, 100 Base T, Gigabit Ethernet and E1/T1.

Apparatus 10 comprises a processor 20 for receiving each of the one or more input signals from the Network Interface. In the example shown, processor 20 receives each input signal through a coupling with a physical layer input device or PHY 15. Here, each Network Interface input signal may be received by physical layer input device 15. Physical layer input device 15 may terminate an external physical interface to the Network. Moreover, input device 15 may also provide an internal bus format supportive of an electro- and/or an opto-scheme. For example, input device 15 may support SONET, E1/T1, OC-3 and/or OC-48 schemes.

In order to support the universal functionality of apparatus 10, processor 20 determines the transport mechanism associated with each of the input signals from the Network Interface. Processor 20 may realize this function by receiving a control or recognition signal identifying transport mechanism employed in the received input signals. Alternatively, processor 20 may recognize the transport mechanism employed by examining the input signal(s) for a pattern. This examination by processor 20 may entail storing a set number of bits in a buffer, for example, and comparing these stored bits against the format rules for corresponding with each transport mechanism.

Processor 20 may perform additional functions in support of apparatus 10. Processor 20 may manage the traffic flow on each input signal from the Network Interface. For example, if the transport mechanism is recognized as an ATM adaptation layer (e.g., AAL1, AAL2, AAL3/4 and/or AAL5), processor 20 may perform standard ATM Layer functions, in addition to other management operations, such as policing and traffic shaping. Processor 20 may also capture an ATM control stream and pass it to an optional signaling control circuit for the support of one or more switched virtual circuits ("SVCs") by tapping from each input signal of the Network Interface.

Moreover, processor 20 may also perform adaptation layer functions on the processed traffic. For example, traffic may be passed from traffic management function to enable the performance of adaptation layer function which may include logical channel processing, error detection, and segmentation and re-assembly, as well as translation between logical ATM cell stream(s) and circuit switched data stream(s). Consequently, the processed traffic stream generated by managing the traffic flow may be converted by processor 20, through the execution of adaptation layer functions, to a circuit switched or packet switched data stream. It should that processor performs similar functions in non-circuit switched formats, such as IP, FR, ISDN, HDSL, ADSL, VDSL, SDSL and 10 base T, for example.

To perform these multiple functions, processor 20 may have a number of realizations. Processor 20 may perform a number of data manipulation steps in parallel. Processor 20 may include a field programmable gate array ("FPGA"), an application specific integrated circuit ("ASIC"), a digital signal processor ("DSP"), a microcontroller and/or a special purpose processor. In one example, processor 20 may comprise a pool of network processors to support common ATM applications running at the rate of two OC-3 line interfaces.

Interface apparatus 10 also includes a bus interface device 25. Bus interface device 25 supports compatibility with the System Interface. To realize this function, bus interface device 25 generates one or more System Interface signals in response to the transport mechanism recognized by processor 20. For the purposes of illustration, bus interface device 25 is coupled with a circuit switched interface 40 (e.g., TDM bus) and a packet switched interface 50 (e.g., packet/cell). Device 25 may support circuit switching, packet switching, circuit and packet switching, as well as some other system interface mechanism. For the purposes of present disclosure, the following tables are exemplary and recite the requirements for each interface supported by bus interface device 25.

Circuit Switched Interface

Buffering

Data Formatting

Timing Resolution

Packet/Cell Bus Interface

Protocol Conversion

Routing (to Internal Resources)

Packet/Cell Bus Access

Once processor 20 performs the adaptation layer functions, such as segmentation and reassembly, on ATM adaptation layer traffic, for example, bus interface device 25 may generate the System Interface signal(s) for the circuit switched and/or packet switched interface. Here, bus interface device 25 is coupled with processor 20 by means of a bus 60. Bus 60 may be realized by a serial and/or parallel architecture. Alternatively, bus 60 may comprise a shared memory (not shown) between processor 20 and bus interface device 25. Other coupling devices and schemes are contemplated by this disclosure.

In one example, the data stream from processor 20 may be directed to bus interface device 25. Thereafter, bus interface device 25 may perform format conversions on the data stream. Moreover, bus interface device 25 resolves any interface timing issues required to pass the data over to the System Interface.

For time division multiplexed applications, bus interface device 25 may be configured to match timing to the circuit switched interface 40. Here, bus interface device 25 may also format the stream, which may comprise segmented and reassembled data. The formatted data stream, consequently, may flow at a predetermined (e.g., fixed) rate to interface 40.

For packet/cell applications, bus interface device 25 may perform the required packet protocol conversions and routing resolutions. Moreover, bus interface device 25 may provide bus access functions. In so doing, bus interface device 25 attempts to ensure that the data is transported to the appropriate resources over packet switched interface 50.

It should be noted that the partitioning of functionality between processor 20 and bus interface device 25 might be fixed, as detailed hereinabove. However, the partitioning of functionality may, in the alternative, shift between processor 20 and bus interface device 25 in response to a control signal and switch (not shown). Thusly, the performance of matching the timing to the circuit switched interface 40 may be executed by bus interface device 25, at processor 20, or a combination thereof. Likewise, the performance of converting each Network Interface signal and the routing each converted Network Interface signal may be performed by bus interface device 25, at processor 20, or a combination thereof. Consequently, other partitioning arrangements are contemplated by the present disclosure.

In one example, interface apparatus 10 may also comprise a control device 30. Control device 30 may provide additional control of each of the elements of interface apparatus 10. Moreover, control device 30 may also communicate with processor 20, as well as communicate with an external system controller (not shown) via a control and communication bus 55. In additional to performing local configuration, maintenance, and call control, control device 30 also may perform signaling protocol processing required to support SVCs. It should be noted that control device 30 might not be necessary, depending on realization of apparatus 10 and elements selected therefore. For example, processor 20 may incorporate signaling and control processing functionality within itself.

Figure 2A:
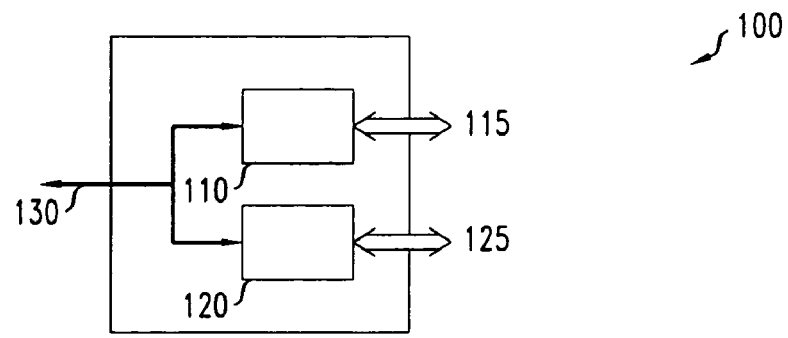
FIGS. 2(*a*) and 2(*b*) each depict an implementation of an aspect of the present invention.
Figure 2B:
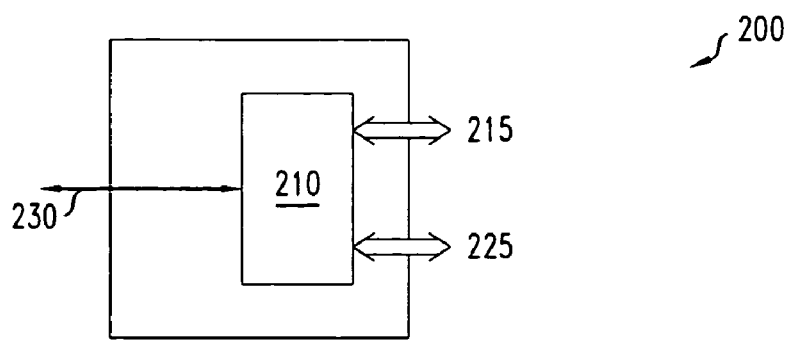

Referring to FIGS. 2(*a*) and 2(*b*), implementations of an aspect of the present invention are illustrated. More particularly, each depicts an implementation of interface apparatus 10 and, more particularly, bus interface device 25 of FIG. 1. Each of these implementations takes into consideration the requirements necessary to provide a compatible interface apparatus for signals having a variety of transport mechanisms.

With respect to FIG. 2(*a*), a bus interface device 100 having a first architecture is shown. Here, bus interface device 100 includes functionality to support a circuit switched (e.g., TDM) interface device 110 and a packet switched (e.g., packet/cell) interface device 120 in parallel. Coupled between a processor bus 130 and a TDM bus 115, circuit switched interface device 110 performs a number of functions, including buffering, data formatting, and timing resolution, for example. Similarly, packet switched interface device 120 performs a number of functions, such as supporting protocol conversion, routing, and bus access, for example. Packet switched interface device 120 is, in turn, coupled with processor bus 130 and a Packet/Cell bus 125.

If the interface apparatus incorporating bus interface device 100 is supporting a circuit switched application, then interface device 110 may be utilized. Similarly, if a packet application is supported by the interface apparatus, interface device 120 may be employed. Moreover, the architecture of bus interface device 100 also enables the simultaneous support of both circuit switched and packet switched applications.

Referring to FIG. 2(*b*), an alternative bus interface device 200 is shown. Unlike the architecture of FIG. 2(*a*), bus interface device 200 employs a single element 210 for interfacing a processor bus 230 with both TDM bus 215 and Packet/Cell bus 225. Here, single element 210 may be realized, for example, by a programmable logic device for interfacing the data flow from the processor via bus 230 to the appropriate System Interface bus. Depending on the application, the programmable logic device might be configured or downloaded with TDM or Packet/Cell bus functionality. Additionally, the present disclosure contemplates alternative configurations, including a single configurable bus architecture, for example, as detailed hereinbelow in conjunction with FIG. 3(*b*).

Figure 3A:
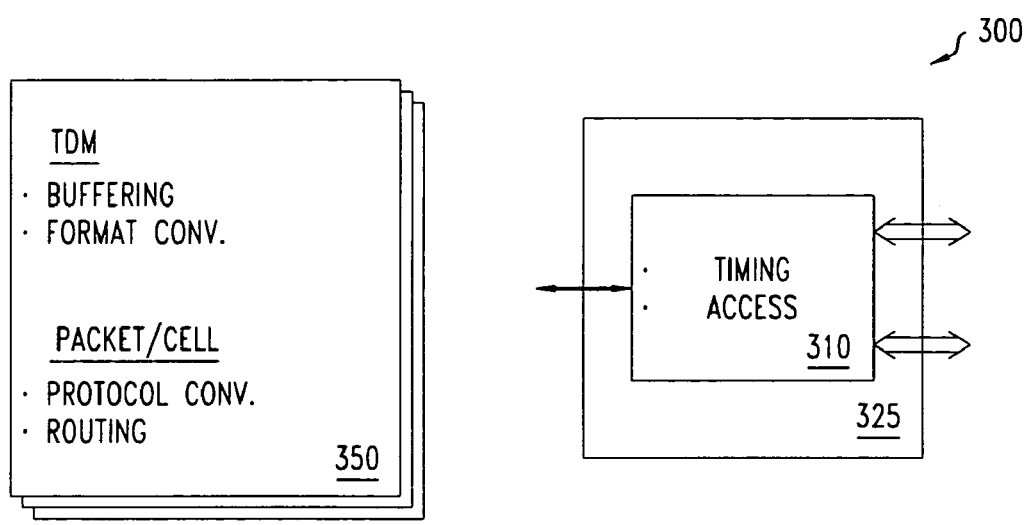
FIGS. 3(*a*), 3(*b*) each depicts an implementation of another aspect of the present invention.
Figure 3B:
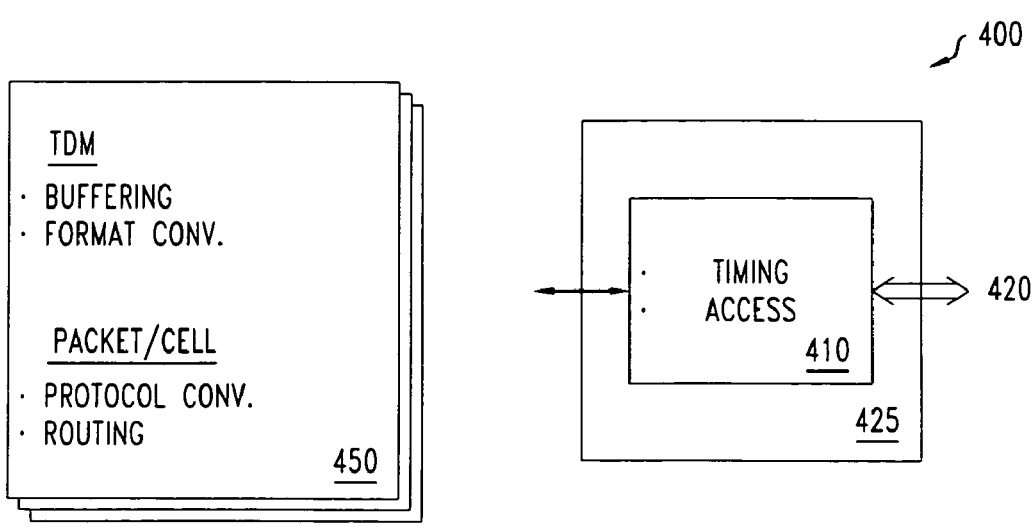

Referring to FIGS. 3(*a*) and 3(*b*), implementations of another aspect of the present invention are illustrated. More particularly, each depicts an alternative partitioning of functionality between processor 20 and bus interface device 25 of FIG. 1. Each alternative partitioning implementation, however, takes into consideration the systematic operation of interface apparatus 10 of FIG. 1. The functionality for each type of bus interface may be partitioned more effectively than simply packing the full functionality for a given application into a programmable logic block. This may result in significant resource savings on the above-referenced interface apparatus (e.g., line card).

With respect to FIG. 3(*a*), a first partitioning 300 between a bus interface device 325 and a network processor(s) 350 is illustrated. Here, a number of interface functions that may be better suited for processor 350, are reassigned from a programmable logic element 310. Consequently, for circuit switched applications, processor 350 may perform data buffering and format conversion, while for packet switched applications, processor 350 may perform protocol conversion and routing functions. TDM Bus timing resolution and the Packet/Cell Bus access functions, however, remain assigned to programmable logic element 310. By the configuration of first partitioning 300, the systematic operation of interface apparatus may afford a simpler, more compact programmable logic element 310. At the same time, tasks that are more processor oriented may be pushed to processor 350, where they may be performed much more efficiently.

Referring to FIG. 3(*b*), an alternative partitioning 400 between a bus interface device 425 and a network processor (s) 450 is illustrated. Here, a single configurable bus 420, serving as both a TDM bus and a Packet/Cell bus, is depicted. Thusly, alternative partitioning 400 employs a programmable logic element 410 for driving single configurable bus 420. However, unlike partitioning 300 of FIG. 3(*a*), the resultant output of bus interface device 425 requires no designation or distinction between TDM bus and Packet/Cell bus. Alternatively, multiple busses may be maintained to enable a dynamic bus allocation at the system level.

It should be noted that the apparatus and architectures detailed hereinabove may also support other data transport modes and protocols. The actual ATM transport protocol may be implemented in firmware on the network processor (s). Therefore, support for various other protocols may be similarly programmed. Similarly, while the bus interface devices disclosed herein support circuit or packet/cell switched services, additional system interfaces may be supported by design, if required.

Given this flexibility, support for Internet Protocol ("IP"), Frame Relay ("FR"), as well as legacy transport technologies, such as E1/T1, for example, may be realized. An external Layer 1 interface, which is supported, may have some dependence on the physical layer input bus device ("PHY") employed. Nonetheless, system designs may provide a mix of interfaces for different Layer 1 requirements.

EXEMPLARY EMBODIMENTS

Figure 4:
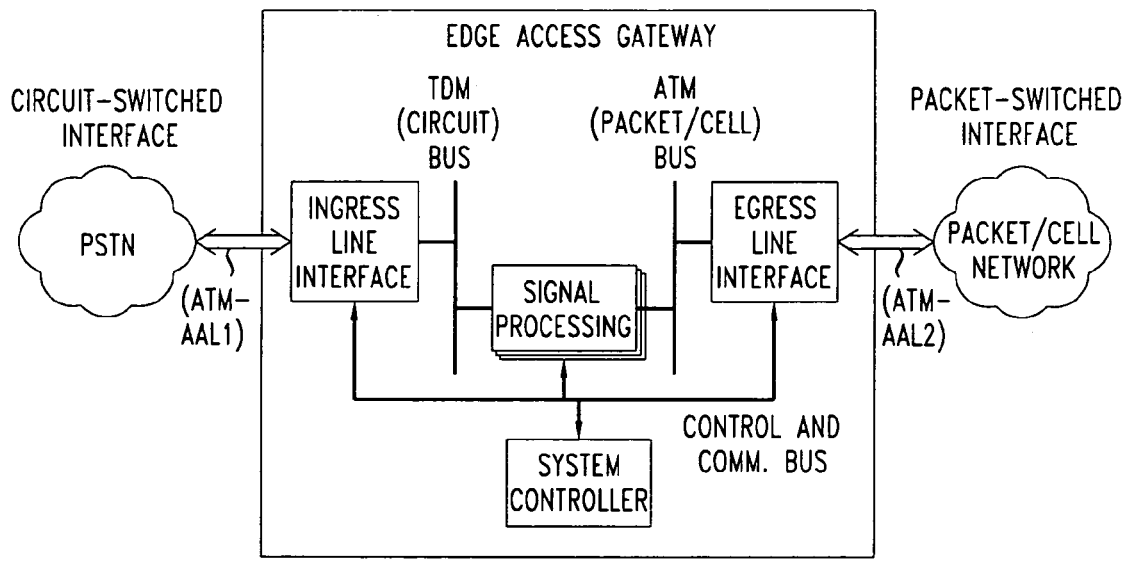
FIG. 4 depicts an application of the present invention.

It may be clear that significantly different hardware implementations may be currently employed to support the different ATM Adaptation Layers, for example. This may limit the implementation of the ATM line interfaces, but also may have implications on overall system design as well. For example, a system application where both circuit-oriented and packet oriented line interfaces are required in a single system is shown in FIG. 4. This system, sometimes referred to as an Edge Access Gateway, is typical for applications where circuit switched connections from a Public Switched Telephone Network ("PSTN"), for example, are interfaced to a packet network. The Edge Access Gateway may support services such as Remote Access Server (RAS) Modem Systems, where a number of dial-up modem connections may be made on the circuit switched interface, and routed via packet switching techniques to their appropriate data server in the packet network. The Edge Access Gateway may also support Voice over IP ("VoIP") Gateway Systems, wherein service circuit switched voice calls, and forward them over an IP network to a terminating gateway.

The PSTN depicted in FIG. 4 may be connected to the Circuit-Switched Interface of the Edge Access Gateway. In this application, calls (or connections) may be transported over an ATM-AAL1 and terminated on an Ingress Line Interface card, for example. This card supports circuit switched connections on the Gateway, and interfaces them to an internal Time Division Multiplexing ("TDM") switching fabric or Bus.

Here, a pool of signal processing resources may take the incoming connections from the ingress side of the Gateway (via the TDM bus), and perform the appropriate processing and protocol handling based on the application. For RAS applications, analog modem processing may be performed, and the data may be bundled according to the desired packet transport format. For VoIP applications, vocoder processing may be performed, and the resultant compressed speech may be wrapped in IP packets, for example.

The output of the signal processing pool may be a number of streams of packet data. These streams may be transported over the internal packet/cell bus to an Egress Line Interface Card. This card may perform some level of packet aggregation, and provide an interface to the external Packet Network. In the application shown, the packet data might be transported over ATM-AAL2.

The system illustrated in FIG. 4 may also include a system controller. The system controller may provide overall call control, provisioning, and maintenance for the Gateway. The system controller may also communicate with the other cards in the system over a Control and Communication Bus.

An interface apparatus or line card that incorporates a flexible architecture may work in existing systems in much the same manner as detailed herein. For example, a universal interface apparatus may be populated in each of the Ingress Line Interface and Egress Line Interface slots shown in FIG. 4. The card on the left side of the figure may be provisioned to support ATM-AAL1, and the card on the right may be provisioned to support ATM-AAL2. All of the existing features may be supported, with the added benefits of decreased system cost, and simpler system maintenance.

Figure 5:
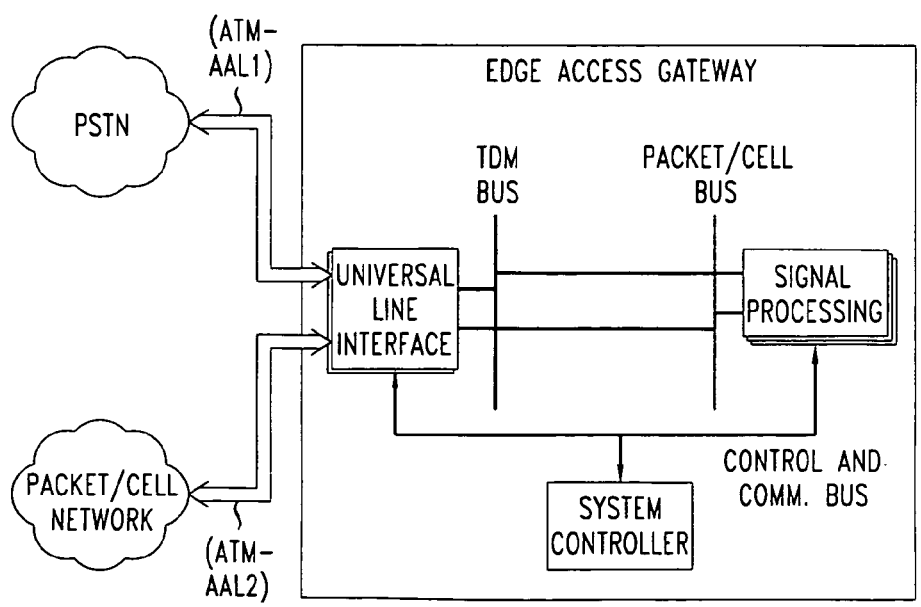
FIG. 5 depicts another application of the present invention.

For new system designs, enhancements may be made to improve the overall system architecture. As shown in FIG. 5, the need to designate any line interface card slot to be specifically associated with the TDM bus or the Packet/Cell bus may be eliminated. Here, a pool of universal line interface card slots may be provided, with connectivity to both busses, and to the pool of signal processing resources. The system depicted in FIG. 5 also shows the configuration of an architecture supporting an EDGE Access Gateway application, similar that of FIG. 4. Other than the provisioning of the Universal Line Interface cards, the operation of the Gateway is much the same as detailed hereinabove.

It should be noted that the bus interface device, detailed hereinabove, might be implemented on both endpoints of the TDM and Packet/Cell busses. In this circumstance, it may be possible to support dynamic bus allocation in the system. The busses may not need to be designated as TDM or Packet/Cell specifically. Rather, the busses may be defined at any time, based on the configuration loaded into the bus interface device at each endpoint. The system may then have a pool of busses that may be allocated based on the desired mix of circuit and pack services required by a given application.

There are several aspects of the flexible architecture detailed hereinabove that may decrease overall system cost. The first issue may be the basic cost of components in the new architecture (e.g., network processors and bus interface devices) may be significantly lower than the cost of the equivalent ATM-specific devices required in previous architectures. This may be especially true considering the more optimal partitioning of the bus interface device, which may be further reduce the cost of that block while also placing a very minor load on the network processor.

System cost may also be influenced by a single line card design that may support multiple ATM Adaptation Layers. In typical systems, this may mean that a single interface card design may satisfy the requirements previously met by two distinct interface card designs. This may effectively double the card production volumes for a given number of channels, and may contribute to economy of scale savings. Further savings in inventory costs may be experienced by having to carrying fewer orderable items.

Having a single line interface card design may also provide advantages in system maintenance for both existing and new system designs. Fewer OA&M (Operation, Administration, and Maintenance) commands may be required to operate the system, and all ATM line interfaces may share the same failure and recovery modes. This may benefit the end user, and result in decreased development and test expenses as well.

As shown in FIG. 5, new system designs may be considered in which any line interface card may service any bus technology, and vice versa. This may eliminate the notion of a system having dedicated slots for ingress and egress line interfaces, as in FIG. 4. Here, the slots may simply be designated as I/O slots, capable of supporting circuit and packet based services, for example.

Internally, this may simplify bussing arrangements on the backplane. More particularly, it may allow system capabilities to be provisioned more flexibly, on an as needed basis. In current systems, it may be necessary during design to allocate a number of slots for the various I/O functions based on a predetermined view of what mix of packet and circuit services may be supported. In new systems, however, a pool of I/O slots may be designed into the system, and the service types may be defined at provisioning time. This may allow any mix of circuit and packet services to be supported in the system.

In addition to the flexibility, the architecture detailed hereinabove may also enable additional features not available using previous designs. For example, the ability to support mixed circuit and packet services on a single line card simultaneously may be supported by the present invention. This may be a relatively straightforward configuration, given the appropriate firmware load for the network processor, as well as the configuration of the bus interface device.

Similarly, dynamic bandwidth allocation on the system busses may also be supported by the present invention. Here, any of the transport busses in the system may be configured as a TDM bus or a Packet/Cell bus, for example. Coupling this feature with the ability to provision any service in any line card slot may present useful alternatives.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. An interface apparatus comprising:
    a processor for receiving at least one network interface signal, and for recognizing a transport mechanism associated with each network interface signal;
    a bus interface device for generating at least one system interface signal in response to the recognized transport mechanism; wherein:
    the transport mechanism comprises at least one of Asynchronous Transfer Mode, Internet Protocol, Frame Relay, Integrated Services Digital Network, High bit-rate Digital Subscriber Line, Asymmetric Digital Subscriber Line, Very High Data Rate Digital Subscriber Line, Symmetric Digital Subscriber Line, 10 base T, 100 base T, Gigabit Ethernet and E1/T1;
    the processor further examines a pattern for each network interface signal to recognize the associated transport mechanism;
    each system interface signal is coupled with at least one of a circuit switched interface, a packet switched interface, and a combined circuit packet switched interface;
    the transport mechanism comprises an adaptation layer of Asynchronous Transfer Mode, the processor performs ATM adaptation layer processing on each Network Interface signal in response to the recognized transport mechanism; and
    at least one of the processor and the bus interface device matches a timing of the circuit switched interface and formats the ATM adaptation layer processed network interface signal to the corresponding system interface signal.

2. The interface apparatus of claim 1, comprising a control switch for partitioning and switching the performance of the matching the timing and the performance of the formatting the ATM adaptation layer processed network interface signal between the processor and the bus interface device in response to a control signal.

3. An interface apparatus comprising:
    a processor for receiving at least one network interface signal, and for recognizing a transport mechanism associated with each network interface signal;
    a bus interface device for generating at least one system interface signal in response to the recognized transport mechanism; wherein:
    the transport mechanism comprises at least one of Asynchronous Transfer Mode, Internet Protocol, Frame Relay, Integrated Services Digital Network, High bit-rate Digital Subscriber Line, Asymmetric Digital Subscriber Line, Very High Data Rate Digital Subscriber Line, Symmetric Digital Subscriber Line, 10 base T, 100 base T, Gigabit Ethernet and E1/T1;
    the processor further examines a pattern for each Network Interface signal to recognize the associated transport mechanism;
    each system interface signal is coupled with at least one of a circuit switched interface, a packet switched interface, and a combined circuit packet switched interface;
    at least one of the processor and the bus interface device converts each network interface signal to correspond with the packet switched interface and routes each converted network interface signal; and
    the interface apparatus further comprises a control switch for partitioning and switching the performance of each said network interface signal conversion and each said network interface signal routing in response to a control signal between the processor and the bus interface device.

* * * * *